(12) United States Patent
Mushketyk et al.

(10) Patent No.: US 12,314,971 B2
(45) Date of Patent: May 27, 2025

(54) SYSTEMS AND METHODS FOR ECONOMIC NEXUS DETERMINATION BY A COMMERCE PLATFORM SYSTEM

(71) Applicant: Stripe, Inc., San Francisco, CA (US)

(72) Inventors: Ivan Mushketyk, Dublin (IE); Kelly Moriarty, Dublin (IE); Michael Carney, Dublin (IE); Aaron Broder, Dublin (IE); Juliana Martinhago, London (GB); David Doran, Dublin (IE)

(73) Assignee: Stripe, Inc., San Francisco, CA (US)

( * ) Notice: Subject to any disclaimer, the term of this patent is extended or adjusted under 35 U.S.C. 154(b) by 211 days.

(21) Appl. No.: 17/496,631

(22) Filed: Oct. 7, 2021

(65) Prior Publication Data

US 2023/0110704 A1    Apr. 13, 2023

(51) Int. Cl.
*G06Q 30/02*    (2023.01)
*G06Q 30/0204*    (2023.01)

(52) U.S. Cl.
CPC ................ *G06Q 30/0205* (2013.01)

(58) Field of Classification Search
None
See application file for complete search history.

(56) References Cited

U.S. PATENT DOCUMENTS

| | | | |
|---|---|---|---|
| 11,238,542 B1* | 2/2022 | Wixted | G06Q 30/0633 |
| 2003/0144931 A1* | 7/2003 | Stokes | G06Q 40/02 |
| | | | 705/31 |
| 2015/0287020 A1* | 10/2015 | Unser | G06Q 20/4016 |
| | | | 705/44 |
| 2020/0184431 A1* | 6/2020 | Sinmao | H04L 9/0637 |
| 2021/0304264 A1* | 9/2021 | Chute | G06Q 30/0283 |
| 2022/0058499 A1* | 2/2022 | Amzal | G06N 20/00 |
| 2022/0076308 A1* | 3/2022 | Zacharias | G06Q 30/0607 |

* cited by examiner

Primary Examiner — Alan Torrico-Lopez
(74) Attorney, Agent, or Firm — Foley & Lardner LLP (57) ABSTRACT

A method and apparatus for performing economic nexus determination by a transaction processing system. The method may include accessing a plurality of transactions associated with a plurality of merchant systems processed by the transaction processing system over a period of time. The method may also include inferring a geographic location, from among a plurality of geographic locations, for each of the plurality of transactions based on one or more transaction parameters. Then, the method may include aggregating a total revenue per geographic location per merchant system based on the inference of geographic location determined from the one or more transaction parameters. For a merchant and for a geographic location for which said merchant has location based revenue within the geographic location, the method may include applying an economic nexus rule corresponding to the geographic location, and determining when the economic nexus rule corresponding to the geographic location is satisfied.

20 Claims, 5 Drawing Sheets

SYSTEMS AND METHODS FOR ECONOMIC NEXUS DETERMINATION BY A COMMERCE PLATFORM SYSTEM

BACKGROUND

Merchants, such as grocers, car services, online marketplaces, etc., provide their products and services to consumers. Such merchants may employ agents to deliver their products and/or provide the actual services to the merchant's customers, provide digital goods directly to their customers, or ship physical goods to consumers. For example, a person acting on the merchant's behalf will drive a consumer in their own car, deliver food ordered through a merchant website, pick up and/or drop off clothes dry cleaned by the merchant, etc. As another example, merchants may provide a website, online marketplace, etc., to sell digital products, such as music, documents, art, unique tokens, etc., to consumers. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

Due modern telecommunications and networking technology, transactions processed by commerce system(s) on behalf of merchants may occur anywhere (e.g., a buyer accessing a merchant's goods or services may be located virtually anywhere in the world). As a result, the merchants may be legally required to pay taxes, such as sales tax (e.g., U.S. and/or U.S. state sales tax), value-added tax (e.g., for countries in the EU, as well as elsewhere), goods and services tax (e.g., for sales occurring in Australia and New Zealand), or other taxes, in numerous geographic locations based on their sales originating within such regions having a sufficient economic nexus. The legal requirements for determining an economic nexus are complex, and vary in each state and/or country having different sets of conditions, sales thresholds, applicability dates, different local currencies, etc. Thus, a complex system of potential legal tax obligation arises due to modern technology for selling goods and/or services, and further based on how economic nexus is determined. For example, when sales originating in Australia exceed 75,000 AUD, an economic nexus exists and the merchant incurs a 10% goods and services tax. However, sales originating in Sweden incur a 25% value-added tax with no threshold, while sales originating in Taiwan incur a 5% tax for total sales exceeding 480,000 NTD. Still further, sales originating within the United States have different sales tax rules applicable to each state. Additionally, some geographic regions account for types of goods sold, define their own thresholds in their currency for taxation purposes, change rules periodically making it hard to track current rules, apply different reporting periods (e.g., prior year beginning on X date, prior two years beginning on Y date, etc.), apply multiple thresholds based on goods sold and/or merchant location, define rules in terms of revenue, define rules in terms of revenue and number of transactions, define revenue locally within the geographic region, define revenue globally, define revenue as including or excluding non-taxable transactions, business-to-business transactions, or other transaction types, and so on. Thus, an extremely complex system of varying economic nexus determinations and associated legal obligations is encountered as merchants grow and expand their sale of their goods and/or services to various geographic locations. To exacerbate the complexity of this problem, as the scale of merchant transactions grows, the tracking of the various legal obligations becomes even more complex, and the number of potential obligations also increases.

Some approaches to determining economic nexus, and thus tax obligations for merchants, include defining complex schema, spreadsheets, or other data structures in which a merchant periodically stores transaction totals. The data structure is then provided to a service that applies the merchant supplied data to processing for economic nexus determination. However, such an approach is time consuming, does not occur in real time or near real time, relies on the data accuracy of the merchant, and is otherwise not ideal. That is, it may be difficult to determine where a transaction originated, thus causing inaccurate sales reporting by the merchant. Furthermore, merchant user time is unduly consumed in creating such specific data structures for reporting. Additionally, due to the time and effort required to generate a reporting, they may be performed at various periods resulting in older and/or inaccurate economic nexus determinations.

Thus, a technical solution within the modern technical environment that minimizes merchant effort, handles transactions at scale across any number of geographic regions and economic nexus requirements, and improves accuracy of determination of transaction origination location, is needed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "inferring", "aggregating", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Figure 1:
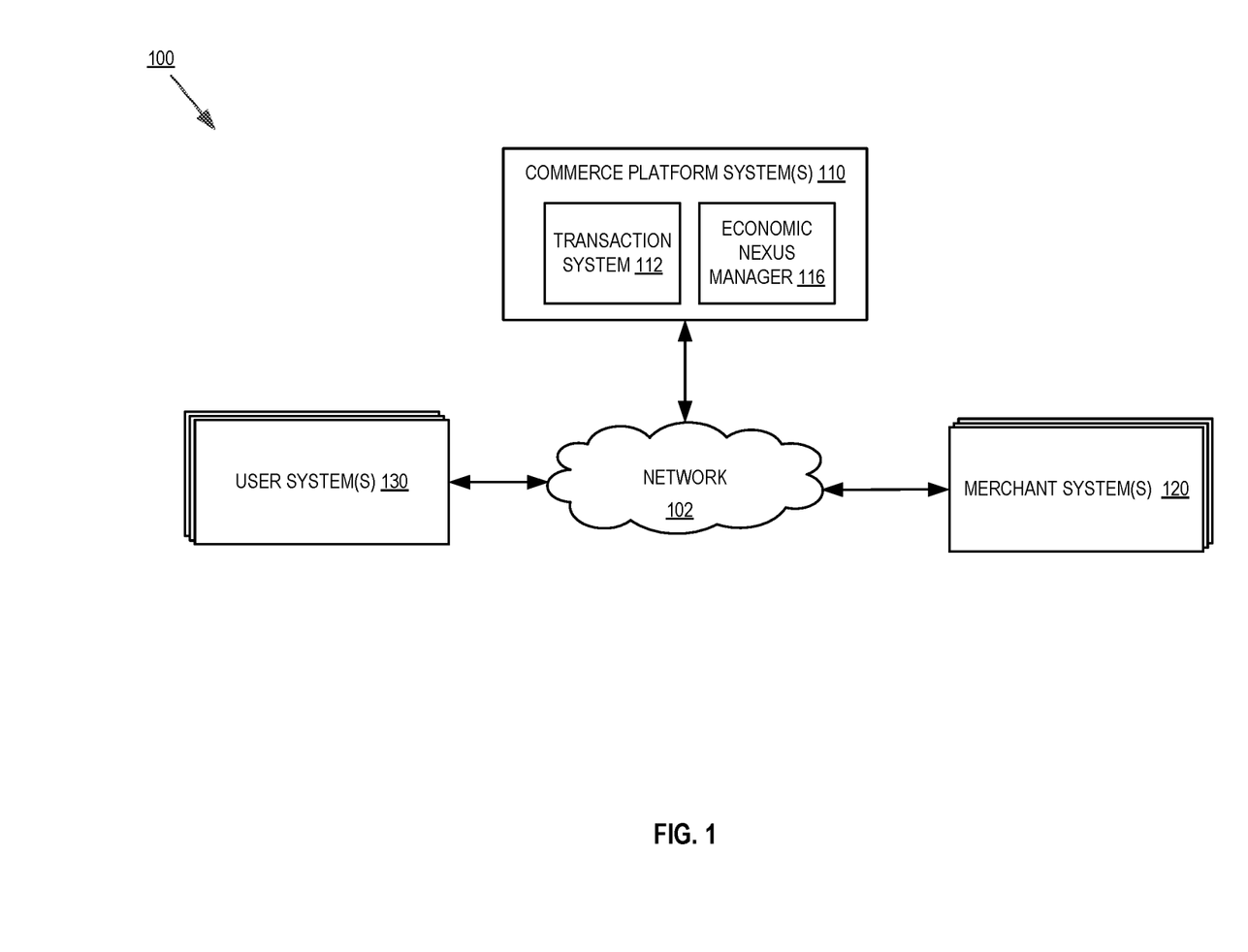
FIG. 1 is a block diagram of an exemplary system architecture for a commerce platform system performing economic nexus determination and reporting for merchants.

FIG. 1 is a block diagram of an exemplary system architecture 100 for a commerce platform system performing economic nexus determination and reporting for merchants. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions initiated at user system(s) 130 performed on behalf of a merchant system 120, clear transactions, performing payouts to merchants and/or merchants' agents, manage merchant and/or agent accounts held at the commerce platform system(s) 110, as well as other services typically associated with commerce platforms systems such as, for example, STRIPE™. For commerce platform systems that operate at scale, such as system 110, the number of transactions on the magnitude of millions or billions of transactions are processed each hour, day, month, etc. by the transaction system 112. Each of these transactions is processed by the transaction system 112 of commerce platform system(s) 110, and data associated with the transaction is stored in a data store of the commerce platform system (e.g., transaction data store 212 discussed below).

In embodiments, transaction data stored by transaction system 112 for each transaction may include, for example, an internet protocol (IP) address of a buy/user system in a transaction, a zip or other area code entered by a user system for a transaction, a phone number, a type of payment method, a payment card type or card brand, a billing and/or shipping address (if available), as well as other information collected by the transaction system 112 for processing of the transaction. Thus, the commerce platform system(s) keeps a record of the transactions, as well as the details of the transaction, generated by the transaction system 112 for each individual transaction. In embodiments, the transaction data is stored by the commerce platform system(s) 110 to enable various services provided to merchant system(s) 120, such as sales tracking, sales accounting, transaction search services, as well as other services. Furthermore, and as will be discussed in greater detail herein, the transaction data stored by the commerce platform system(s) 110 may be leveraged by economic nexus manager 116 to make economic nexus determinations for each merchant associated with the merchant system(s) 120.

In embodiments, economic nexus manager 116 of the commerce platform system(s) 110 performs real-time economic nexus determination with minimal or no merchant effort, including providing indications of accuracy of economic nexus determinations, as discussed herein. More specifically, economic nexus manager 116 periodically accesses the transaction records generated and stored by the transaction system 112. As discussed herein, various data is stored for each transaction, such as IP address of a user system 130, user entered transaction information such as a zip code or address associated with billing (i.e., for clearing a payment or providing shipping), a payment method used for a transaction, a card type used for a transaction, as well as other information. In embodiments, economic nexus manager 116 extracts these geographic indicators from transaction records as data relevant to determining origin of a given transaction. For example, a lookup may be performed on an IP address to determine physical location of a user system 130. As another example, some payment methods, card brands, etc. may be indicative of a location of a transaction (e.g., card brand X is only given out to consumers in Australian, whereas card brand Y is given out to consumers in the US). Furthermore, user entered information for completion of payment may also have georgic location indicators, such as a zip code associated with a payment method, a shipping address, etc.

In embodiments, economic nexus manager 116 may use one or more of these geographic location indicators extracted from transaction data records to infer a location associated with a transaction. While, in embodiments, some indicators, such as location of an IP address, may be sufficient alone to infer geographic location, in some embodiments, a plurality of factors may be used to infer geographic location by comparing a totality of the geographic location indicators associated with the various data, such as a combination of IP address, zip code address, billing address, shipping address, payment method (e.g., regional payment methods), etc. In embodiments, such location information is uniquely available to commerce platform system(S) 110 by extraction from processed transactions, and is sufficient to infer an independent (e.g., not based on $3^{rd}$ party reporting) and accurate (e.g., sufficient to perform an associated financial transaction) geographic location of each transaction.

After locations are inferred for transactions, economic nexus manager 116 aggregates revenue totals for merchants for locations in which transactions occurred over a period of time. For example, for a given Merchant_X, transactions may have occurred in the US, Canada, and Mexico over a prior twelve-month period, and thus revenue totals would be generated accordingly based on inferred locations of each transaction of Merchant_X over the twelve-month period. As another example, Merchant_Y may have transactions originating in the US, the EU, Australia, Singapore, and Japan, and thus revenue totals in those locations over the twelve-month period would be generated for Merchant_Y. It should be noted that the period for which revenue totals may vary by time period, be location-specific, nexus rule-specific, or otherwise varied according to the requirements of given economic nexus rules, discussed below. However, in embodiments, a period of time in which an economic nexus rules apply is not necessarily the same period in which revenue totals are generated. Thus, in embodiments, revenue totals may first be generated for sub periods of time (e.g., each day, week, month, etc.) over the period of time (e.g., 12-month), and then appropriate economic nexus rule revenue totals for an associated time period generated. This may be seen as a two stage processing of location based revenue so that location based revenue totals may be generated.

Then, in embodiments, economic nexus manager 116 applies location specific economic nexus rules to each applicable geographic region revenue total for each merchant. In embodiments, each economic nexus rule defines a relevant location and a set of conditions for determining sufficiency of economic nexus, such as one or more of a sales threshold defined in local currency (e.g., $1 mill USD, $75k AUD, etc.), a time period for determining an economic nexus (e.g., period calendar year, within current physical year, a calendar month, last 30 days, etc.), a threshold number of transactions (e.g., 10, 100, 500, etc.), as well as other conditions used by various geographic regions in defining sufficient economic nexus to trigger legal requirements. Thus, continuing the example above, for Merchant_X, economic nexus rules defined for the US, Canada, and Mexico would be accessed and applied (according to the conditions of the rule defining one or more of relevant time period, relevant total, currency used, type of goods/services, etc.) to the revenue totals aggregated by economic nexus manager 116 for the period of time associated with the rule. By applying the rule and the conditions defined within the rule, economic nexus manager 116 determines whether a sufficient economic nexus exists for a merchant, for each location for which transactions have occurred in a relevant time period. In embodiments, this can include determining if an economic nexus exists, how close a merchant is to meeting an economic nexus when a sufficient economic nexus does not exist, etc.

Furthermore, in embodiments, location determination discussed above may result in an ambiguous or unknown user system location. For example, an IP address's location may be invalid or inconsistent with other geographic indicators extracted from a transaction. As another example, a partial location determination may be made, such as when a location may be determined for a geographic region (e.g., the US) but not for a specific sub region in which rules apply (e.g., a US state). In such cases, where location cannot be accurately inferred, or only a portion of geographic location can be inferred, economic nexus manager 116 further generates unattributable revenue totals (with any associated geographic indicators). In embodiments, unattributable revenue totals act as accuracy indicators for economic nexus determinations reported to merchant system(s) 120. That is, the higher a ratio of unattributable revenue total is, compared to attributable revenue, the higher the likelihood that a nexus prediction is inaccurate. For example, if a revenue total of Merchant_Y for Australia is $20,000 AUD, but the merchant has $60,000 AUD unattributable revenue, then the economic nexus to Australia may be deemed as inaccurate (i.e., since an economic nexus exists in Australia at $75,000 AUD and the attributable revenue+unattributable revenue could reach an economic nexus). However, if a revenue total of Merchant_Y for Australia is $75,001 AUD, but the merchant has $60,000 unattributable revenue, then the economic nexus to Australia may be deemed as accurate (i.e., since a sufficient economic nexus exists with attributable revenue). Thus, economic nexus manager is further able to indicate a level of accuracy and/or confidence with respect to economic nexus predications in view of how much revenue is unattributable over a period of time.

In embodiments, economic nexus manager 116 performs the economic nexus determinations on a periodic basis, such as hourly, daily, weekly, monthly, quarterly, etc. Furthermore, one or more notifications and/or reporting may be generated for merchant system(s) 120 to summarize the resulting economic nexus determinations. For example, an electronic mail message summarizing economic nexus determinations (e.g., locations where sufficient nexus was found, locations where a merchant is nearing sufficient economic nexus, other locations where revenue was collected, unattributable income, etc.) may be generated and transmitted to the associated merchant systems 120. In other embodiments, such economic nexus reporting information may be provided to merchants using one or more graphical user interfaces, such as in merchant account portals, on-demand user interfaces, etc.

Therefore, economic nexus manager 116 accurately detects economic nexus sufficiency for merchants in real time or near real time as the nexus determinations occurs in relevant time periods (e.g., hourly, daily, monthly, etc.). Furthermore, economic nexus manager 116 is able to infer locations of transactions directly from transaction records using data extracted from the records, such as IP address, card information entered for a transaction, payment information, etc., and thus generate revenue totals automatically for merchants with zero to very little merchant effort.

Figure 2:
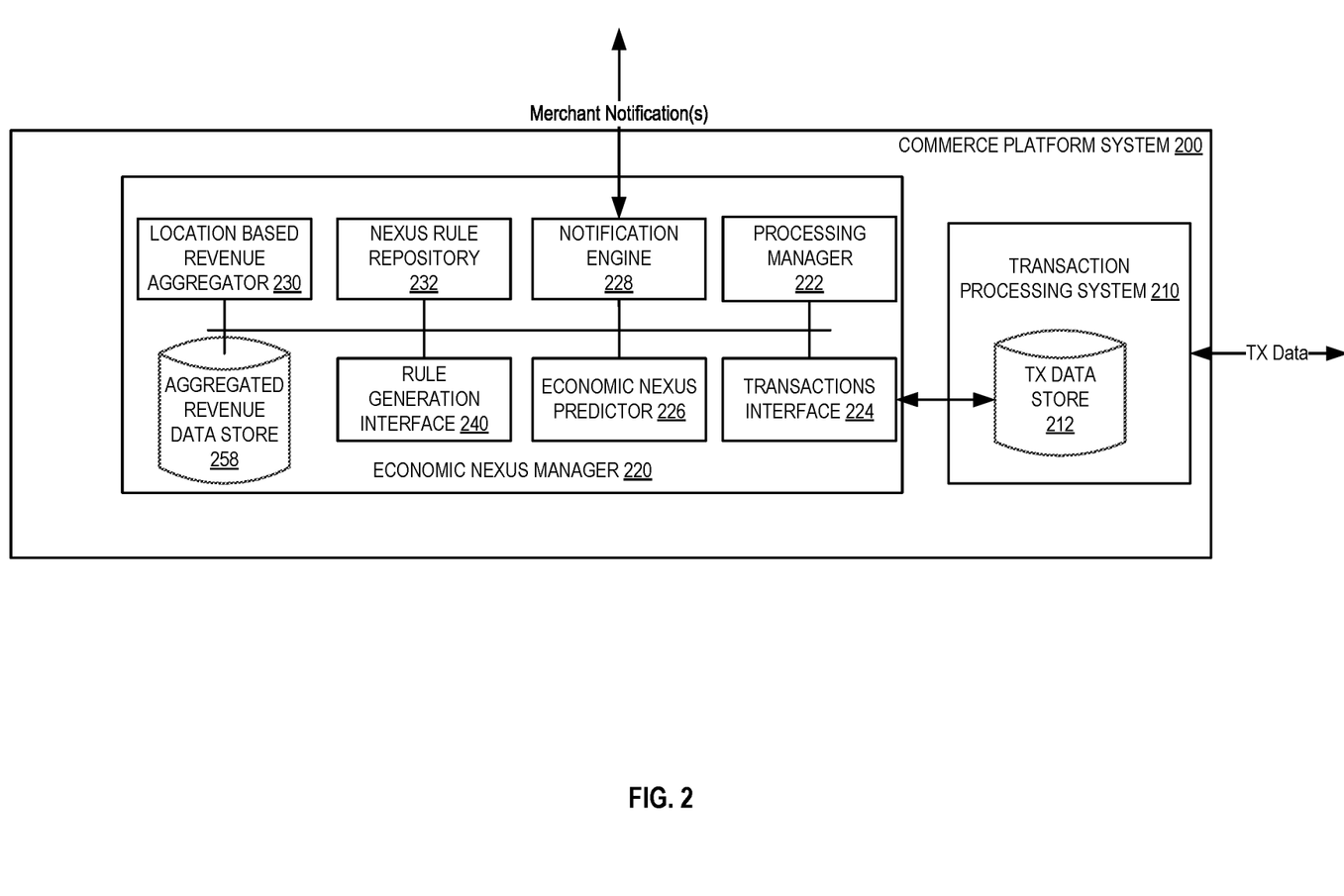
FIG. 2 is a block diagram of one embodiment of an economic nexus manager of a commerce platform system.

FIG. 2 is a block diagram of one embodiment of an economic nexus manager 220 of a commerce platform system 200. Commerce platform system 200 and economic nexus manager 220 provides additional details for the commerce platform system(s) 110 and economic nexus manager 116 discussed above in FIG. 1.

In one embodiment, commerce platform 200 includes a transaction processing system 210. In embodiments, the transaction processing system 210 is responsible for receiving and processing transactions originating from merchant system(s) (not shown) and user system(s) (not shown) over a communications network (e.g., network 102). For example, the transactions may be financial transactions performed by transaction processing system 210 including, but not limited to, purchases, refunds, credit requests, subscriptions, etc.

Transaction processing system 210 maintains a transaction data store 212 for each merchant which uses the services of the commerce platform system 210. The data store 212 may include a transaction record, and associated data, for each transaction processed by transaction processing system 210. Furthermore, as discussed above, each transaction record may include various data, including data with geographic and/or location indicators, such as an IP address of a user system (e.g., reported by, or collected from, a buyer system during a transaction), a phone number, a payment method, a card type, a card brand, information entered for payment processing (e.g., shipping address, billing address, zip code of payment method/card, etc.), as well as other information.

In embodiments, processing manager 222 of the economic nexus manager 220 is responsible for controlling the operations of the transaction interface 224, rule generation interface 240, nexus rule repository 232, location based revenue aggregator 230, notification engine 228, and economic nexus predictor 226, as discussed below. Furthermore, in embodiments, economic nexus manager 220 may further include an aggregated revenue data store 258 to store pre or partially processed location based aggregated revenue totals, according to some embodiments.

Initially, rule generation interface 240 provides an interface between the nexus rule repository 232 and users of the commerce platform system 200 that are responsible for defining and updating economic nexus rules. As indicated above, each economic nexus rule is associated with a geographic location and set of conditions used for determining whether a sufficient economic nexus exists with the geographic location. For example, the conditions may include a time period for judging an economic nexus, type of goods that implicate nexus determination, threshold revenue total, type of local currency in the event conversion/exchange in needed, threshold number of transactions, etc. Furthermore, in embodiments, the rules may further specify requirements associated with satisfied rules, such as reporting requirements (e.g., legal notice requirements), tax requirements (e.g., a percentage of sales tax, VAT, GST, etc. owed), as well as other requirements. Thus, users of the commerce platform system 200 may generate new economic nexus rules for new geographic regions, update existing economic nexus rules in response to regulatory changes, etc. as needed to reflect current and accurate economic nexus regulations.

In embodiments, transactions interface 224 periodically (e.g., hourly, daily, weekly, monthly, etc.) accessed transaction records within transaction data store 212. In some embodiments, transactions interface 224 accesses records over a period of time, such as transaction records for the past calendar year, fiscal year, two years from the current date, etc. However, other periods of time, such as records generated within an immediately prior period (e.g., hour, day, week, etc.) may be accessed, for example in embodiments where historical revenue totals are maintained within aggregated revenue data store 258 as discussed below. In either embodiment, the transaction records for the period of time are processed by the location based revenue aggregator 230.

In embodiments, location based revenue aggregator 230 is responsible for parsing each transaction record to extract and process data relevant for location inference. As discussed above, this may include extracting an IP address associated with a buyer device in a transaction record and looking up a location associated with the IP address, extracting a card brand and determining whether the brand is relevant to a geographic location, extracting one or more elements of user entered information for clearing a transaction (e.g., billing Zip code, shipping address, etc.), or a combination of such operations. One or more of these extracted and determined geographic indicators may be analyzed by location based revenue aggregator 230 for each transaction to infer a geographic location of the transaction, and thus an origin location of the revenue from the transaction. Furthermore, a single geographic indicator may be sufficient to infer location (e.g., an IP address based location, a zip code based location, a billing address, a mailing address, a regional payment method, etc.), although a comparison of geographic indicators may be used to confirm accuracy of an inferred geographic location (e.g., an IP address based location is consistent with user entered data, such as billing address) or form a consensus location inference (e.g., using a best approximation of location based on totality of location indicators, which may be weighted based on reliability to inference).

Furthermore, in some embodiments, transaction location may not be able to be determined, or may be ambiguous with disagreeing location indicators. In this case, such a transaction may be associated with (i.e., labeled) unattributable revenue. Additionally, one or more geographic indicators, if available, may be associated with the transaction (e.g., originating in the US, but from an unknown state) where an ultimate location is ambiguous or unknown.

After inferring location of transactions, or unattributable revenue, location based revenue aggregator 230 aggregates total revenue for each merchant for each geographic location for a sub period of time (e.g., hour, day, week, etc.) over a period of time (e.g., year, fiscal year, two year period, etc.). This may be seen as a first stage of location based revenue aggregation processing. In embodiments, the revenue total may then be stored in aggregated revenue data store 258 for the sub period of time (e.g., hourly, daily, weekly, etc. totals per merchant/location). In embodiments, this may be repeated for each sub period for the given period of time (e.g., each hour, day, week, etc. for a calendar year) for generating revenue totals for the associated sub period of time. In one embodiment, the aggregated revenue data store 258 may be a persistent storage of historical revenue totals such that location based revenue aggregator processes only a most recent sub period, which is added to prior historical records. However, in other embodiments, aggregated revenue data store 258 is a temporary storage that only stores sub period revenue totals until nexus predications are completed and notifications sent to merchants. In this embodiment, the temporary storage may then be deleted and await data from a next processing by location based revenue aggregator 230.

Location based revenue aggregator 230 may then aggregate revenue totals from the sub periods of time over relevant nexus periods of time as defined by various location based economic nexus rules in repository 232. This can be considered as a second stage of location based revenue aggregation processing. That is, for example, for geographic locations with a calendar year requirement, calendar year revenue totals for the merchant are determined. As another example, for a geographic location with a monthly requirement, monthly revenue totals are determined. By dividing the location based revenue aggregation processing into stages, processing efficiencies can be realized by avoiding unnecessary revenue totals processing. Thus, location based revenue aggregator 230 may access economic nexus rules within nexus rule repository to determine, by location, the relevant economic nexus period for which a revenue total should be determined, and totals the revenue sub periods associated with that economic nexus period.

Furthermore, economic nexus predictor 226 access the nexus rule repository 232 and the revenue totals generated by location based revenue aggregator 230 to analyze aggregated revenue totals against the conditions specified in relevant nexus rules. The analysis by economic nexus predictor 226 includes applying the conditions from an economic nexus rule associated with a geographic location to the revenue total for the geographic location. The analysis results, such as when a rule is satisfied (e.g., revenue total threshold met, transaction number threshold met, etc.), how close a merchant is to satisfying a nexus rule (e.g., revenue within x % of total revenue required to satisfy nexus requirement), how much unattributable income was found for a merchant, etc., are communicated to notification engine 228.

Notification engine 228 collects the analysis results. In an embodiment, for satisfied economic nexus determinations, notification engine 228 further collects reporting and/or tax obligation requirements from the relevant rules in nexus rule repository. Notification engine 228 uses the analysis results, and obligations, unattributable revenue, totals for geographic locations for which a merchant has revenue but has not yet satisfied nexus requirements, etc. to generate one or more of a graphical user interface or electronic message notifications, which are provided to a merchant system. Such notifications may be provided on demand, such as when requested by a merchant through a merchant portal graphical user interface. However, notifications may be automatically generated and transmitted to a merchant, such as on a reporting periodic basis (e.g., monthly, quarterly, yearly, etc.), when an economic nexus is found, etc.

Figure 3:
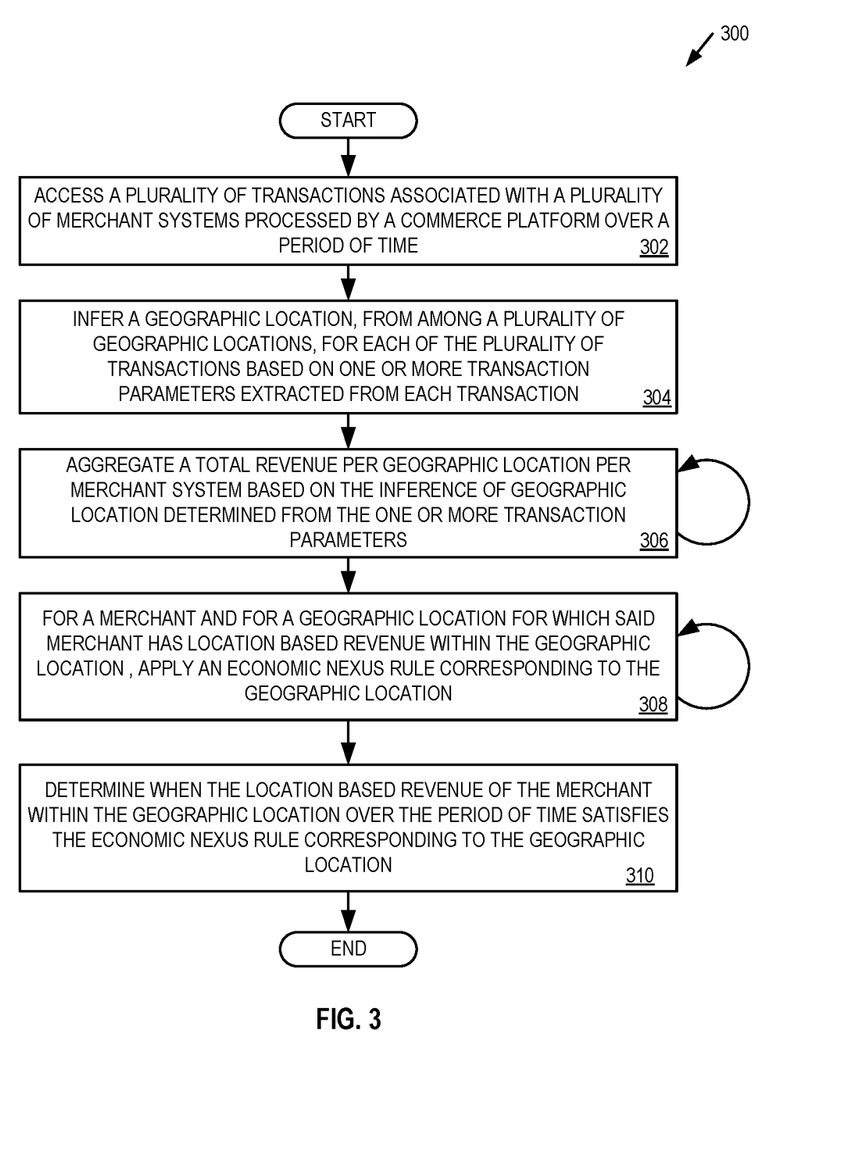
FIG. 3 one embodiment of a method for performing economic nexus determination by a commerce platforms system.

FIG. 3 is a flow diagram of one embodiment of a method 300 for performing economic nexus determination by a commerce platforms system. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3, processing logic begins by accessing a plurality of transactions associated with a plurality of merchant systems processed by a commerce platform over a period of time (processing block 302). As discussed herein, the commerce platform system provides payment processing services to the merchant systems, and therefore stores transaction records for each merchant transaction. Furthermore, as discussed above, each transaction record may include various transaction parameters that enable the services that commerce platform system provides to the merchant system. In embodiments, such transaction parameters may include data with, or relevant to, geographic indicators of the origin of the transaction, such as IP address of a user computer, collected card information (e.g., card brand), payment method, user supplied data for processing a transaction (e.g., zip code, payment address, shipping address, etc.), as well as other information collected during transaction processing and relevant to location inference, as discussed herein.

Processing logic then infers a geographic location, from among a plurality of geographic locations, for each of the plurality of transactions based on one or more transaction parameters extracted from each transaction (processing block 304). That is, for each transaction various potentially relevant data providing geographic parameters may be extracted from each transaction. Then, in embodiments, the inference may be based upon a single transaction parameter providing data indicative of geographic location of the origin of a transaction (e.g., IP address lookup of the location of a user's computer during a transaction, billing address of an entered payment method, shipping address of an order, zip code extracted from a transaction, etc.). However, in embodiments, other geographic location indicators may be used and/or combined with one another to determine geographic origin of a transaction (e.g., using an IP address based location, confirmed with a provided zip code, billing address, shipping address, etc.). Additionally, in some embodiments, for unsuccessful or ambiguous geographic inferences, the revenue from such transaction may be labeled as unattributable.

Processing logic aggregate a total revenue per geographic location per merchant system based on the inference of geographic location determined from the one or more transaction parameters (processing block 306). That is, processing logic generates location based revenue totals for each merchant. Furthermore, as discussed above, the aggregation may involve multiple processing stages, where in a first stage revenue totals are generated for sub period of time (e.g., each hour, day, week, etc.) over a period of time (e.g., calendar year, fiscal year, two-year period from a current date, etc.), and in a second stage revenue totals relevant to economic nexus determination for a given geographic location are aggregated from the sub period totals. That is, in embodiments, a revenue total generated during the second processing stage for a location may be based on only those transactions that fall within an economic nexus period of time as defined in an economic nexus rule associated with the location. Thus, a final aggregated location based revenue total for location_A may be generated from sub period revenue totals for the prior 30 days, whereas a final aggregated location based revenue total for location_B may be generated from the sub period revenue totals for the prior calendar year. In some embodiments, the total is accompanied by additional data, such as the location to which the aggregated total applies, a total number of transaction occurring within the period, etc. In embodiments, the multi-stage aggregation processing is performed for each merchant and for each location of the commerce platform system, or for each merchant that uses the economic nexus services of the commerce platform system.

For a merchant and for a geographic location for which said merchant has location based revenue within the geographic location, processing logic applies an economic nexus rule corresponding to the geographic location (processing block 308), and determines when the location based revenue of the merchant within the geographic location over the period of time satisfies the economic nexus rule corresponding to the geographic location (Processing block 310). In an embodiment, processing logic, for the geographic location accesses an economic nexus rule to obtain one or more conditions for determining sufficiency of economic nexus (e.g., threshold revenue, threshold number of transactions, etc.). The conditions are applied to the aggregated location based revenue totals to determine whether a sufficient economic nexus exists for the location, how close a merchant is to a sufficient economic nexus, whether unattributable revenue renders a nexus inference reliable or unreliable, etc. This process of applying economic nexus rules is repeated for each location for which a merchant has revenue, and then for again for each additional merchant.

Figure 4:
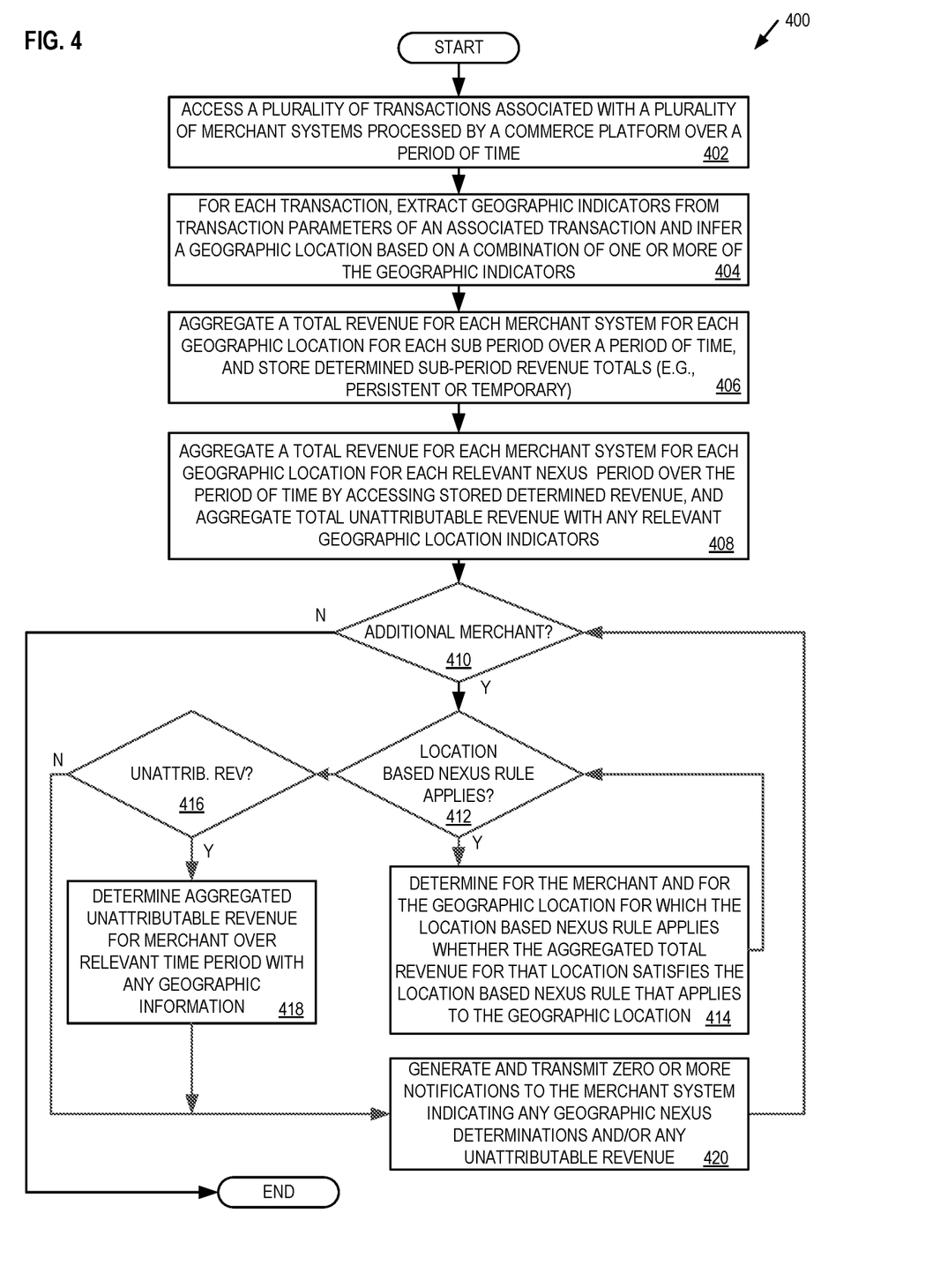
FIG. 4 is a flow diagram of one embodiment of a method for performing economic nexus determination and notification by a commerce platforms system.

FIG. 4 is a flow diagram of one embodiment of a method for performing economic nexus determination and notification by a commerce platforms system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200).

Referring to FIG. 4, processing logic begins by accessing a plurality of transactions associated with a plurality of merchant systems processed by a commerce platform over a period of time (processing block 402). For each transaction, processing logic extracts geographic indicators from transaction parameters of an associated transaction and infers a geographic location based on a combination of one or more of the geographic indicators (processing block 404).

Processing logic then aggregates a total revenue for each merchant system for each geographic location for each sub period over the period of time, and stores determined sub-period revenue totals (e.g., persistent or temporary) (processing block 406). Processing logic, as discussed herein, performs per merchant per location revenue aggregation for sub-periods (e.g., hour, day, week, etc.) over a larger period of time (e.g., year, fiscal year, two-year period, etc.). These sub-periods are generated in a first processing stage of location based revenue aggregation and stored in a data store. As discussed above, the sub-period revenue totals may be stored in a persistent storage so that processing block 406 only aggregates a most recent set of transaction records. However, in other embodiments, the storage is temporary and released/deleted at the completion of the process of FIG. 4.

Processing logic then aggregates a total revenue for each merchant system for each geographic location for each relevant nexus period over the period of time by accessing stored determined revenue, and aggregate total unattributable revenue with any relevant geographic location indicators (processing block 408). In embodiments, to ensure an accurate relevant nexus time period revenue total is obtained, processing logic may access an associated location's economic nexus rule. The location based revenue total aggregation for each merchant for their associated relevant nexus periods is performed in a second processing stage of the location based revenue aggregation and stored in the data store for use by processing block 410-420 below. In embodiments, any unattributable revenue is also totaled per merchant to provide indicators of accuracy of revenue total determination.

Then processing logic performs a per merchant process by determining if there are additional merchants for determining economic nexus sufficiency (processing block 410). That is, each merchant and their respective location based revenue totals and unattributable revenue is processed according to blocks 412-420, until all merchants have been processed and the process ends.

When there is at least one merchant for which economic nexus sufficiency determinations are to be made, processing logic determines if a location based economic nexus rule applies (processing block 412). When it does, processing logic determines for the merchant and for the geographic location for which the location based nexus rule applies whether the aggregated total revenue for that location satisfies the location based nexus rule that applies to the geographic location (processing block 414). In some embodiments, processing logic may perform currency conversion of an aggregated revenue total to a local currency for which an economic nexus rule applies, so that sufficiency is judged using the appropriate currency and/or exchange rate.

Processing logic then returns to block determine if another location based nexus rule applies to the merchant. That is, processing logic determines whether the merchant is associated with revenue from another location. When the merchant does have location based revenue from another geographic location, processing logic repeats block 412 for the next location.

However, when there are no more locations for which a given merchant has location attributable revenue (processing block 412), processing logic then determines if the merchant is associated with any unattributable revenue (processing block 416). when the merchant is associated with unattributable revenue, processing logic determines aggregated unattributable revenue for merchant over the relevant time period with any geographic information (processing block 418).

After block 418, or after it is determined at block 416 that the merchant has no unattributable revenue, processing logic generates and transmits zero or more notifications to the merchant system indicating any geographic nexus determinations and/or any unattributable revenue (processing block 420). The notifications, as discussed herein, may include notifications generated in response to the economic nexus analysis and sent proactively to merchant systems (e.g., via email, SMS, MMS, or other communications type). In another embodiment, the notifications can be provided to the merchant and accessed via a graphical user interface generated by processing logic, such as via a merchant portal on a website served by a commerce platform system. Furthermore, the notifications can include one or more of the geographic location of an applied nexus rule, total revenue for the geographic location, nexus rule and conditions applied, whether the rule was satisfied and a sufficient economic nexus exists for the location, relation of revenue to rule parameters such as total when a sufficient economic nexus does not exist for the location, total unattributable revenue, etc.

The process may then return to block 410 where processing logic determines if blocks 412-420 should be repeated for additional merchants. When all merchants have been processed for sufficiency of one or more economic nexus determinations, the process ends.

In embodiments, processing improvements may be realized by processing logic. For example, in some embodiments, one or more processes may be performed using parallel processing. That is, blocks 412-420 may be carried out for two or more merchants simultaneously, with each merchant's aggregate revenue totals accessed, and economic nexus determinations and reportings processed by a different parallel processing task, thread, etc. As each merchant's totals and reportings do not rely on those of other merchants, processing logic may be configured to perform the processes of blocks 412-420 using any number of parallel executions of blocks 412-420. Similarly, blocks 402-408 may also be processed in parallel, for example for each geographic location supported by processing logic. Additionally, any combination of processing blocks 402-420 may utilize parallel processing to distribute the tasks associated with different locations, merchants, etc.

Figure 5:
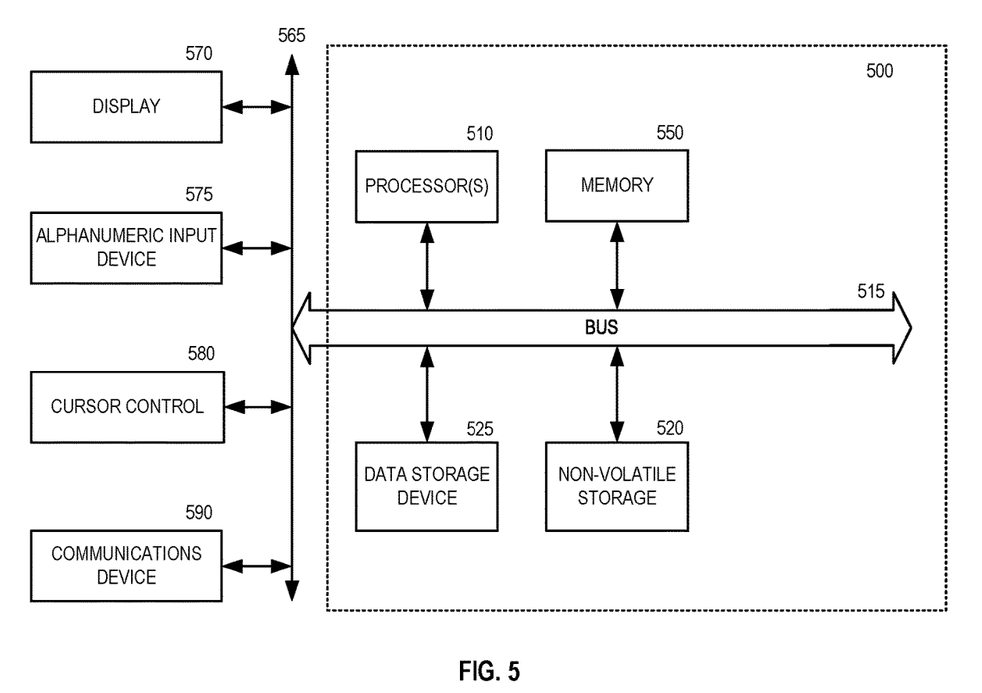
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant development system, merchant user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for reducing use of processing resources of a transaction processing system by performing economic nexus determination by the transaction processing system in real time or near real time, the method comprising:

accessing, by the transaction processing system and in a transaction data store of the transaction processing system, transaction records generated by the transaction processing system for a plurality of transactions performed on behalf of a plurality of merchant systems over a period of time through an application programming interface (API) of the transaction processing system, the plurality of merchant systems being associated with a plurality of merchants;

extracting, by the transaction processing system and from the transaction records, geographic indicators that include an internet protocol (IP) address of a user computer system that initiated a transaction of the plurality of transactions and one or more other parameters that include one or more of a payment method used for the transaction, a card brand used for the transaction, or information entered via the user computer system for completion of the transaction,
   wherein the geographic indicators are uniquely available to one or more platform systems, that include the transaction processing system, by extraction from the transaction records and are sufficient to independently infer a geographic location for the transaction;

inferring, by the transaction processing system, without use of third party reporting, and based on the geographic indicators, a plurality of geographic locations for the plurality of transactions comprising:
   performing, by the transaction processing system, a lookup on the IP address to determine a physical location of the user computer system, and
   determining whether the transaction has an ambiguous or unknown geographic location based on an inconsistency between the IP address and the one or more other parameters,
   wherein the plurality of geographic locations include the geographic location;

computing, by the transaction processing system and in real time or near real time relative to the period of time, a total revenue per geographic location per merchant system based on the plurality of geographic locations, comprising:
   aggregating, by the processing resources of the transaction processing system and during a first revenue aggregation stage, a total revenue for a merchant for each geographic location for a plurality of sub periods of time over the period of time,
   storing, in an aggregated revenue data store of the transaction processing system, the aggregated total revenue for each sub period of time as location based sub-period revenue totals for the merchant, and
   aggregating, by the processing resources of the transaction processing system, during a second revenue aggregation stage, and by accessing the sub-period revenue totals for the merchant in the aggregate revenue data store, location revenue totals only for relevant nexus periods of time, comprising:
   determining, for the geographic location and based on an economic nexus rule corresponding to the geographic location, a relevant nexus period for which a location revenue total, of the location revenue totals, should be determined, and
   determining the location revenue total by totaling particular sub-period revenue totals, of the sub-period revenue totals, associated with the relevant nexus period;

applying, by the transaction processing system, the economic nexus rule corresponding to the geographic location;

determining, by the transaction processing system and for the location revenue total, an accuracy indicator based on unattributable revenue from one or more transactions, of the plurality of transactions, having one or more ambiguous or unknown geographic locations;

generating notifications based on the accuracy indicator, wherein the notifications are a summarization of results of economic nexus satisfaction and include obligations to perform based on the economic nexus rule; and transmitting the notifications using a notification engine as electronic messages to the merchant system that accesses the notifications using a graphical user interface (GUI) generated by the transaction processing system.

2. The method of claim 1,
   wherein the one or more other parameters include the information entered via the user computer system, and
   wherein the information, entered via the user computer system, comprises a zip code, a billing address, a shipping address, or a combination thereof.

3. The method of claim 1, further comprising:
   determining, by the transaction processing system, that a location cannot be determined for a subset of transactions of the plurality of transactions; and
   labeling each transaction from the subset of transactions as unattributable income that is not associated with a geographic location for which an economic nexus rule is defined.

4. The method of claim 1, further comprising:
   generating, by the transaction processing system, at least one notification for the merchant indicating a sufficient economic nexus has been determined for the geographic location; and transmitting, by the transaction processing system, the at least one notification to a merchant system associated with the merchant.

5. The method of claim 1, wherein applying the economic nexus rule corresponding to the geographic location, further comprises:
determining, by the transaction processing system, a local currency of the geographic location;
converting, by the transaction processing system, location based revenue within the geographic location to the local currency; and
applying, by the transaction processing system, the economic nexus rule corresponding to the geographic location using a currency converted location based revenue total.

6. The method of claim 1, wherein the economic nexus rule comprises a geographic location to which the economic nexus rule applies, and a set of one or more conditions defining the economic nexus rule, the one or more conditions comprising a local currency, a revenue threshold associated with sufficiency of economic nexus, a number of transactions threshold associated with sufficiency of economic nexus.

7. The method of claim 1, wherein the transaction processing system comprises a commerce platform system or a payment processing system.

8. One or more non-transitory computer readable storage media including instructions that, when executed by a processor, cause the processor to perform operations for performing economic nexus determination by a transaction processing system, the operations comprising:
accessing, by the transaction processing system in a transaction data store of the transaction processing system, transaction records generated by the transaction processing system for a plurality of transactions associated with a plurality of merchant systems having payments processed by the transaction processing system over a period of time over a communications network and through an application programming interface (API) of the transaction processing system, the plurality of merchant systems being associated with a plurality of merchants and the plurality of transactions being associated with a plurality of different payment methods;
extracting, by the transaction processing system and from the transaction records, geographic indicators that include an internet protocol (IP) address of a user computer system that initiated a transaction of the plurality of transactions and one or more other parameters that include one or more of a payment method used for the transaction, a card brand used for the transaction, or information entered via the user computer system for completion of the transaction,
wherein the geographic indicators are uniquely available to the transaction processing system by extraction from the transaction records and are sufficient to independently infer a geographic location for the transaction;
inferring, by the transaction processing system in real-time or near real time during processing of the plurality of transactions and without use of third party reporting, the geographic location, from among a plurality of geographic locations, by performing a lookup on the IP address and determining whether the transaction has an ambiguous or unknown geographic location based on an inconsistency between the IP address and the one or more other parameters;

computing by the transaction processing system, a total revenue per geographic location per merchant system based on the geographic location, comprising:
aggregating, by processing resources of the transaction processing system during a first revenue aggregation stage, a total revenue for a merchant for each geographic location for a plurality of sub periods of time over the period of time,
storing, in an aggregated revenue data store of the transaction processing system, the aggregated total revenue for each sub period of time as location based sub-period revenue totals for the merchant, and
aggregating, by processing resources of the transaction processing system during a second revenue aggregation stage by accessing the sub-period revenue totals for the merchant in the aggregate revenue data store, a total location based revenue for the merchant for each geographic location from location based sub-period revenue totals that occurred during a relevant nexus period of time, comprising: determining when an economic nexus rule, that defines the relevant nexus period of time as a period of time for which sufficiency of economic nexus is to be determined, exists for a location, and computing sub-period revenue totals generated for the merchant and the location for the relevant nexus period of time defined in the economic nexus rule associated with the location;
for a merchant and for a geographic location for which said merchant has location based revenue within the geographic location, applying, by the transaction processing system, an economic nexus rule corresponding to the geographic location;
determining, by the transaction processing system, when the location based revenue of the merchant within the geographic location over the period of time satisfies the economic nexus rule corresponding to the geographic location and computing an accuracy indicator based on unattributable revenue from one or more transactions having one or more ambiguous or unknown geographic locations;
generating, notifications based on the accuracy indicator automatically in real time or near real time whenever an economic nexus rule becomes satisfied, wherein the notifications are a summarization of results of economic nexus satisfaction and include obligations to perform based on the satisfied economic nexus rule; and
transmitting, in real time or near real time, the notifications using a notification engine as electronic messages to the merchant system that accesses the notifications over the communications network using a graphical user interface (GUI) generated by the transaction processing system.

9. The one or more non-transitory computer readable storage media of claim 8,
wherein the one or more other parameters include the information entered via the user computer system, and
wherein the information, entered via the user computer system, comprises a zip code, a billing address, a shipping address, or a combination thereof.

10. The one or more non-transitory computer readable storage media of claim 8, further comprising:
determining, by the transaction processing system, that a location cannot be determined for a subset of transactions of the plurality of transactions; and labeling each transaction from the subset of transactions as unattributable income that is not associated with a geographic location for which an economic nexus rule is defined.

11. The one or more non-transitory computer readable storage media of claim 8, further comprising:
generating, by the transaction processing system, at least one notification of the notifications for the merchant indicating a sufficient economic nexus has been determined for a geographic location, the notification comprising one or more of: the geographic location of an applied economic nexus rule, a total revenue for the geographic location satisfying the applied economic nexus rule, one or more conditions defined by the applied economic nexus rule used to determine sufficiency of economic nexus, an indication of whether the applied economic nexus rule was satisfied, a relationship of a determined total revenue for the geographic location and an economic nexus income requirement for the geographic location when a sufficient economic nexus does not exist for the geographic location, an aggregated total of unattributable income that is not associated with the geographic location, or a combination thereof; and
transmitting, by the transaction processing system, the notification to a merchant system associated with the merchant.

12. The one or more non-transitory computer readable storage media of claim 8, wherein applying the economic nexus rule corresponding to the geographic location, further comprises:
determining, by the transaction processing system, a local currency of the geographic location;
converting, by the transaction processing system, location based revenue within the geographic location to the local currency; and
applying, by the transaction processing system, the economic nexus rule corresponding to the geographic location using a currency converted location based revenue total.

13. The one or more non-transitory computer readable storage media of claim 8, wherein the economic nexus rule comprises a geographic location to which the economic nexus rule applies, and a set of one or more conditions defining the economic nexus rule, the one or more conditions comprising a local currency, a revenue threshold associated with sufficiency of economic nexus, a number of transactions threshold associated with sufficiency of economic nexus.

14. A transaction processing system for performing economic nexus determination, comprising:
a memory; and
a processor, coupled with the memory, configured to:
access transaction records generated by the transaction processing system for a plurality of transactions associated with a plurality of merchant systems having payments processed by the transaction processing system over a period of time over a communications network and through an application programming interface (API) of the transaction processing system, the plurality of merchant systems being associated with a plurality of merchants and the plurality of transactions being associated with a plurality of different payment methods,
extract, from the transaction records, geographic indicators that include an internet protocol (IP) address of a user computer system that initiated a transaction of the plurality of transactions and one or more other parameters that include one or more of a payment method used for the transaction, a card brand used for the transaction, or information entered via the user computer system for completion of the transaction,
wherein the geographic indicators are uniquely available to the transaction processing system by extraction from the transaction records and are sufficient to independently infer a geographic location for the transaction;
infer, in real-time or near real time during processing of the plurality of transactions, the geographic location, from among a plurality of geographic locations, by performing a lookup on the IP address and determining whether the transaction has an ambiguous or unknown geographic location based on an inconsistency between the IP address and the one or more other parameters,
compute a total revenue per geographic location per merchant system based on the geographic location causing the processor to:
aggregate, by processing resources of the transaction processing system during a first revenue aggregation stage, a total revenue for a merchant for each geographic location for a plurality of sub periods of time over the period of time,
store, in an aggregated revenue data store of the transaction processing system, the aggregated total revenue for each sub period of time as location based sub-period revenue totals for the merchant, and
aggregate, by processing resources of the transaction processing system during a second revenue aggregation stage by accessing the sub-period revenue totals for the merchant in the aggregate revenue data store, a total location based revenue for the merchant for each geographic location from location based sub-period revenue totals that occurred during a relevant nexus period of time, comprising: determining when an economic nexus rule, that defines the relevant nexus period of time as a period of time for which sufficiency of economic nexus is to be determined, exists for a location, and computing sub-period revenue totals generated for the merchant and the location for the relevant nexus period of time defined in the economic nexus rule associated with the location;
for a merchant and for a geographic location for which said merchant has location based revenue within the geographic location, apply an economic nexus rule corresponding to the geographic location;
determine when the location based revenue of the merchant within the geographic location over the period of time satisfies the economic nexus rule corresponding to the geographic location and compute accuracy indicator based on unattributable revenue from one or more transactions having one or more ambiguous or unknown geographic locations;
generate notifications based on the accuracy indicator automatically in real time or near real time whenever an economic nexus rule becomes satisfied, wherein the notifications are a summarization of results of economic nexus satisfaction and include obligations to perform based on the satisfied economic nexus rule; and transmitting, in real time or near real time, the notifications using a notification engine as electronic messages to the merchant system that accesses the notifications over the communications network using a graphical user interface (GUI) generated by the transaction processing system.

15. The method of claim 1, wherein the aggregation of the total revenue per geographic location is performed during the first revenue aggregation stage by a first set of parallel processing tasks comprising a plurality of parallel aggregation processing tasks for processing two or more geographic regions in parallel, each of the first set of parallel aggregation processing tasks being associated with a different geographic location; and wherein the application of the economic nexus rule corresponding to the geographic location, and the determination of when the location based revenue satisfies the economic nexus rule corresponding to the geographic location is performed by a second set of parallel processing tasks during the second revenue aggregation stage comprising a plurality of merchant economic nexus determination processes for processing two or more merchant economic nexus determinations in parallel, each of the second set of parallel processing tasks being associated with a different merchant.

16. The method of claim 1, wherein the one or more other parameters include the payment method used for the transaction.

17. The method of claim 16, wherein determining whether the transaction has an ambiguous or unknown geographic location based on an inconsistency between the IP address and the payment method used for the transaction.

18. The method of claim 1, wherein the one or more other parameters include the card brand used for the transaction.

19. The method of claim 18, wherein determining whether the transaction has an ambiguous or unknown geographic location based on an inconsistency between the IP address and the card brand used for the transaction.

20. The method of claim 18, wherein the card brand is only given out in a particular country.

* * * * *